United States Patent
Hufker et al.

(12)

(10) Patent No.: US 11,190,940 B1
(45) Date of Patent: Nov. 30, 2021

(54) PRIVATE GATEWAY MESSAGE ARCHIVAL AND RETRIEVAL

(71) Applicant: T-MOBILE INNOVATIONS LLC, Overland Park, KS (US)

(72) Inventors: David Hufker, Shawnee, KS (US); Lyle W. Paczkowski, Mission Hills, KS (US); George J. Schnellbacher, Overland Park, KS (US); Michael D. Svoren, Jr., Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 259 days.

(21) Appl. No.: 16/440,980

(22) Filed: Jun. 13, 2019

(51) Int. Cl.
  *H04W 12/80* (2021.01)
  *H04W 4/12* (2009.01)
  *H04W 12/088* (2021.01)

(52) U.S. Cl.
  CPC ........... *H04W 12/088* (2021.01); *H04W 4/12* (2013.01); *H04W 12/80* (2021.01)

(58) Field of Classification Search
  CPC ... H04W 12/037; H04W 12/80; H04W 12/02; H04W 12/033; H04W 12/08; H04W 24/00; H04W 4/021; H04M 15/00; H04M 15/31; H04M 15/41; H04M 15/58; H04M 15/60; H04L 2209/38; H04L 63/30; H04L 63/302; H04L 63/304; H04L 63/306; H04L 63/308; G06F 21/552
  See application file for complete search history.

(56) References Cited

U.S. PATENT DOCUMENTS

| | | | |
|---|---|---|---|
| 2013/0326631 A1* | 12/2013 | Cartmell | H04W 12/80 726/26 |
| 2019/0295202 A1* | 9/2019 | Mankovskii | H04L 9/3239 |

* cited by examiner

*Primary Examiner* — Philip Sobutka

(57) ABSTRACT

A message archival and retrieval system is disclosed comprising a telecommunications service provider server that receives a request for messages associated with a party from a government agency server and transmits a grey list to one or more private gateways. The system also comprises a private gateway configured to couple a plurality of user equipment (UE) to a radio access network that receives the grey list from the telecommunications service provider server, identifies data messages associated with the party from one or more of the plurality of UE based on identifying information included in the grey list, continues transmission of the identified data messages to one or more intended endpoints, and stores the identified data messages and corresponding metadata in one or more block chains in a message data store. The one or more block chains are transmitted to the government agency server in response to the request for messages.

20 Claims, 7 Drawing Sheets

PRIVATE GATEWAY MESSAGE ARCHIVAL AND RETRIEVAL

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The Communications Assistance for Law Enforcement Act (CALEA) enables law enforcement agencies to conduct lawful interception of communications. Telecommunications service providers are required to comply with legal requests for information under CALEA.

SUMMARY

In an embodiment, a message archival and retrieval system is disclosed. The system comprises a telecommunications service provider server comprising a non-transitory memory and a processor that receives a request for messages associated with a party from a government agency server. The request comprises identifying information associated with the party. The telecommunications service provider server also transmits a grey list to one or more private gateways. The grey list comprises the identifying information associated with the party. The system also comprises a private gateway of the one or more private gateways configured to couple a plurality of user equipment (UE) to a radio access network. The private gateway comprising a non-transitory memory and a processor that receives the grey list from the telecommunications service provider server, identifies a plurality of data messages associated with the party from one or more of the plurality of UE based on the identifying information included in the grey list, continues transmission of the plurality of identified data messages to one or more intended endpoints, and stores the plurality of identified data messages and corresponding metadata in one or more block chains in a message data store. The one or more block chains are transmitted to the government agency server in response to the request for messages.

In another embodiment, a method for message archival and retrieval is disclosed. The method comprises receiving, by a telecommunications service provider server, a request for messages associated with a party from a government agency server. The request comprises identifying information associated with the party. The method also comprises transmitting, by the telecommunications service provider server, a grey list to one or more private gateways configured to couple a plurality of user equipment (UE) to a radio access network. The grey list comprises the identifying information associated with the party. The method additionally comprises receiving, by a private gateway of the one or more private gateways, the grey list from the telecommunications service provider server, identifying, by the private gateway, a plurality of data messages associated with the party from one or more of the plurality of UE based on the identifying information included in the grey list, and continuing, by the private gateway, transmission of the plurality of identified data messages to one or more intended endpoints. The method further comprises storing, by the private gateway, the plurality of identified data messages and corresponding metadata in one or more block chains in a message data store and transmitting, by the telecommunications service provider server, the one or more block chains to the government agency server in response to the request for messages.

In yet another embodiment, a method for message archival and retrieval is disclosed. The method comprises receiving, by a telecommunications service provider server, a request for messages associated with a party from a government agency server. The request comprises identifying information associated with the party. The method also comprises transmitting, by the telecommunications service provider server, a grey list to one or more private gateways configured to couple a plurality of user equipment (UE) to a radio access network. The grey list comprises the identifying information associated with the party. The method additionally comprises receiving, by a private gateway of the one or more private gateways, the grey list from the telecommunications service provider server, identifying, by the private gateway, a plurality of data messages associated with the party from one or more of the plurality of UE based on the identifying information included in the grey list, continuing, by the private gateway, transmission of the plurality of identified data messages to one or more intended endpoints, and storing, by the private gateway, the plurality of identified data messages and corresponding metadata in a message data store. The method further comprises identifying a plurality of voice messages associated with the party from one or more of the plurality of UE based on the identifying information in the request for messages, storing and associating the identified plurality of voice messages with the plurality of identified data messages in the message data store based on the corresponding metadata, and transmitting, by the telecommunications service provider server, the plurality of identified data messages and the plurality of associated and identified voice messages to the government agency server in response to the request for messages.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
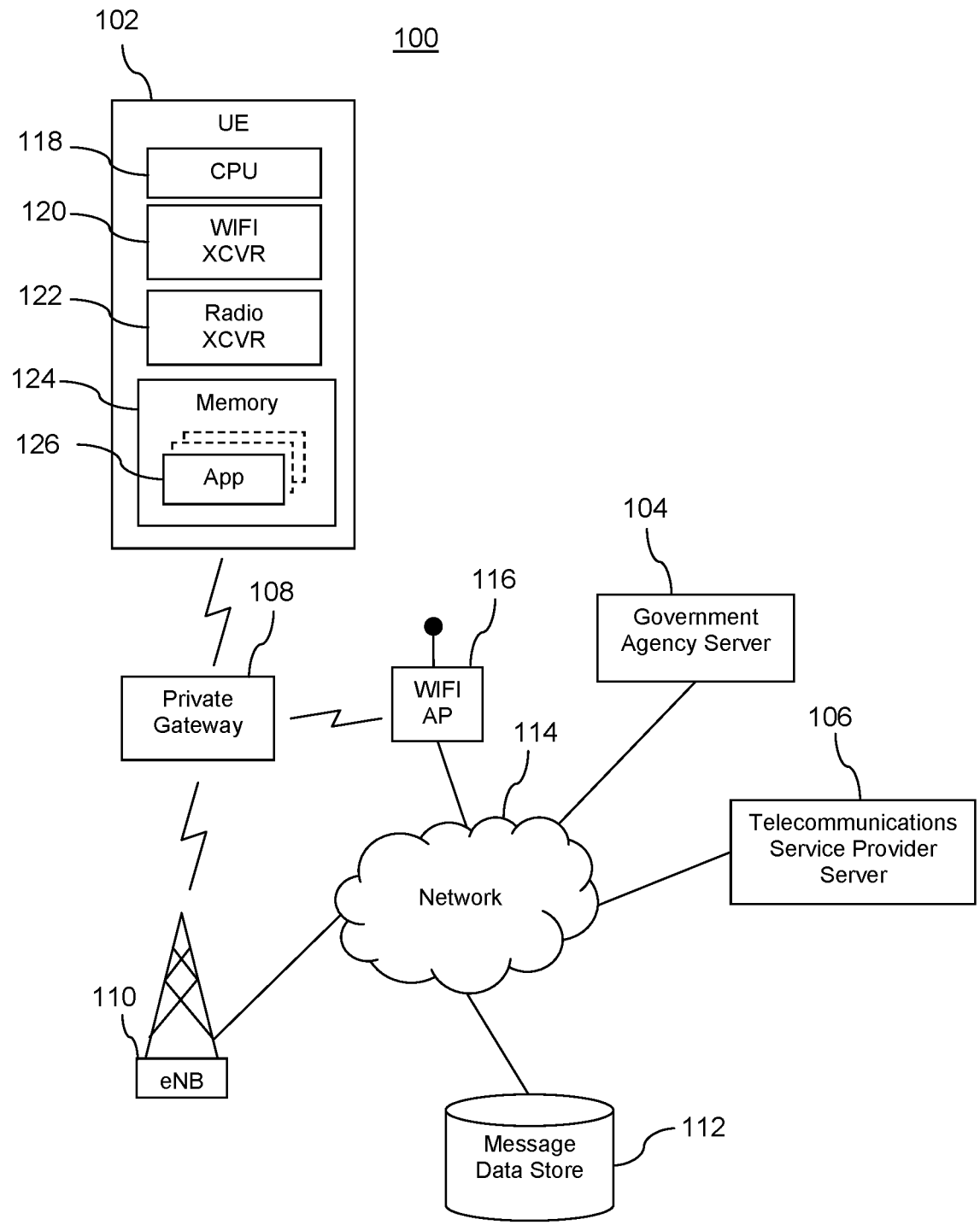
FIG. 1 is a block diagram of a wireless communication network according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Under the Communications Assistance for Law Enforcement Act (CALEA), telecommunications service providers are required to comply with legal requests for information. The legal requests for information can pertain to voice and/or data communications. Traditional voice switches on the U.S. market today have a CALEA intercept feature built in that can single out a subscriber named in a warrant for intercept and then send some or all of the intercepted data to a law enforcement agency. However, Internet Protocol (IP) transport elements such as routers, switches, etc. do not contain a built-in CALEA intercept feature. For example, gateway appliances such as a private gateway used to facilitate improved data communication with a telecommunications network does not have a built-in CALEA intercept feature.

The private gateway may be configured to couple one or more user equipment (UE) to a radio access network (RAN) in a distributed network. The private gateway may be less robust at the endpoints than a conventional cell site (e.g., a cell tower) and hence there may be less opportunity for storage. Said in other words, a private gateway may be a less expensive, smaller electronic device with modest processing capacity and modest memory storage in comparison to a cell site. The private gateway may be a magic box or a mini tower used at a home or a place of business.

Satisfying regulatory reporting rules associated with CALEA requests including allowing for real-time surveillance of any telephone or Internet traffic with regard to IP transport elements such as the private gateway discussed above is challenging because data messages can be manipulated such as by changing ports and protocols or using encryption techniques to try to avoid detection. For example, to avoid detection, a malefactor may send a sequence of separate but related data messages directed to different ports and/or protocol ports of the private gateway. To address the above challenges, the pending application is directed to a message archival and retrieval system and methods that uses a grey list to identify relevant data messages transported via the private gateway and creates a trusted and immutable database of such messages such as by using block chain. For example, in response to a request from a government agency server for messages associated with a party of interest, a telecommunications service provider server may transmit a grey list, which includes identifying information associated with the party of interest from the request, to one or more private gateways. Any private gateway that receives the grey list from the telecommunications service provider server may identify data messages associated with the party of interest being transmitted through the private gateway from one or more UE based on the identifying information included in the grey list and then continue transmission of such identified data messages to the intended endpoints. The identified data messages may comprise any type of data messages. For example, the identified messages may comprise text messages such as short message service (SMS) messages and multimedia messaging service (MMS) messages as well as messaging application messages, in-app messages, and/or email messages.

If ports and protocols are changed or specific encryption techniques are used, the message archival and retrieval system and methods can still identify relevant and related data messages based on metadata associated with the data messages. For instance, the message archival and retrieval system and methods may track related and relevant data messages based on originating and/or destination endpoints. In another example, if there are rotating IP addresses being used, the message archival and retrieval system and methods may identify related and relevant data messages by tracking the application that is sending the data messages. Further, updated grey lists may be dynamically generated and sent to the private gateway to capture any changes.

The private gateway may store the identified data messages and corresponding metadata such as a time stamp, an originating endpoint, a destination endpoint, and/or an application associated with an identified data message in one or more block chains in a message data store. Each identified data message and its corresponding metadata may be stored in a separate block in a block chain. Each block chain may correspond to a single communication session. Identified data messages may be determined to correspond to a particular communication session based on the metadata associated with the identified data messages. The telecommunications service provider server may transmit the one or more block chains to the government agency server to comply with the request for messages.

The message archival and retrieval system and methods discussed herein can also accommodate and rationalize different streams of communication. For example, voice messages and corresponding metadata may also be stored along with the data messages in one or more block chains to help create a more robust and complete trusted and immutable database of messages and comply with regulatory reporting rules including CALEA requests. Voice messages associated with the party of interest from one or more UE may be identified based on the identifying information included in the initial request from the government agency server. The identified voice messages may be stored and associated with the identified data messages in the message data store based on corresponding metadata. For example, the identified voice messages may be stored with the identified data messages in one or more block chains. The telecommunications service provider server may transmit the one or more block chains to the government agency server to comply with the request for messages.

One skilled in the art understands the process of how distributed ledger technology (DLT) is used to securely store records, but a basic description is provided here. In some forms of DLT, blocks are used to store information and then the blocks are connected in a chronological technique to form a block chain. These blocks are inherently resistant to modification of the data. The first block (sometimes referred to as a genesis block) may be created by a block foundry in the network through an algorithm. A request for a new block to be created may be sent to a plurality of nodes in the network. A block typically comprises a block number, a nonce value, a timestamp, a plurality of information (e.g., identified messages and corresponding metadata, etc.), a hash value, and the hash value of the previous block, which links the block with the previous block. A hash is a string of data with a given size (e.g., 64-bits, 128-bits, 256-bits) that is based on the information in the block (e.g., the block number, the nonce value, the transactions, and the previous hash). The nonce value is varied by the nodes in the network in order to solve the hash value based on a hashing algorithm. No meaningful data can be derived from the hash of the block. In other words, the plurality of information (e.g., identified messages and corresponding metadata, etc.) stored in the block cannot be back-solved based on the hash. The nodes in the network collectively validate new blocks when a request is sent, and once a block is validated, it cannot be retroactively altered without invalidating the subsequent blocks. Typically, blocks are validated on a majority rule (e.g., 50%+1 vote) in the network, wherein the majority of nodes in the network are in consensus, or agreement. Each block comprises the hash and the hash of the previous block, which links the two blocks.

Turning now to FIG. 1, a system 100 is described. In an embodiment, the system 100 comprises a user equipment (UE) 102, a government agency server 104, a telecommunications service provider server 106, a private gateway 108, an eNodeB (eNB) 110, a message data store 112, and a network 114. In an embodiment, the system 100 further comprises a WIFI access point 116 that is configured to establish a wireless communication link and provide communication connectivity to the network 114.

The UE 102 may comprise a processor 118, a WIFI transceiver 120, a radio transceiver 122, and a memory 124. The memory 124 may comprise a non-transitory memory portion that stores a client application 126. The UE 102 may be a mobile phone, a personal digital assistant (PDA), a media player, a wearable computer, a headset computer, a laptop computer, a tablet computer, a notebook computer, an Internet of Things (IoT) device, or any combination thereof.

The UE 102 may be configured to use the radio transceiver 122 to establish a wireless communication link with the eNB 110 to provide access to the network 114. The radio transceiver 122 of the UE 102 may communicate with the eNB 110 using any of a variety of wireless communication protocols including a code division multiple access (CDMA) wireless communication protocol, a global system for mobile communication (GSM) wireless communication protocol, a long-term evolution (LTE) wireless communication protocol, a world-wide interoperability for microwave access (WiMAX) wireless communication protocol, or another wireless communication protocol. In some embodiments, the radio transceiver 122 of the UE 102 may communicate with the eNB 110 using a 5G wireless communication protocol. In some contexts, the eNB 110 may be referred to as a base transceiver station (BTS), a cell tower, or cell site. The UE 102 may also be configured to use the WIFI transceiver 120 to establish a wireless communication link with the WIFI access point 116 to provide access to the network 114. The network 114 may comprise one or more private networks, one or more public networks, or a combination thereof. For example, the network 114 may comprise a radio access network (RAN) of a telecommunications service provider. The UE 102 may access the network 114 to obtain a variety of communication services.

The government agency server 104 may be associated with a government agency. The government agency may be a local government agency or a federal government agency. The government agency server 104 may issue requests for messages associated with a party of interest. For example, the government agency server 104 may issue a request for messages associated with a party to the telecommunications service provider server 106. The request may be issued by the government agency server 104 as a result of a subpoena. The party of interest may be an individual or a group of individuals. In an embodiment, the request issued by the government agency server 104 comprises identifying information of the party. For example, the identifying information of the party may comprise a name, a telephone phone number, a nickname, an alias name, an alias telephone number, and/or other identifying information. In an embodiment, the requests issued by the government agency sever 104 are CALEA requests.

The telecommunications service provider server 106 may be associated with a telecommunications service provider. In an embodiment, the telecommunications service provider server 106 receives the request for messages associated with the party of interest from the government agency server 104. The telecommunications service provider server 106 may then transmit a grey list to one or more private gateways. For example, the telecommunications service provider server 106 may transmit the grey list to the private gateway 108. In an embodiment, the grey list comprises the identifying information associated with the party received in the request from the government agency server 104. The grey list may be created by the telecommunications service provider server 106 or by another server based on the identifying information received in the request from the government agency server 104. The grey list may comprise the identifying information included in the request from the government agency server 104.

In an embodiment, the telecommunications service provider server 106 transmits the grey list to a subset of a plurality of private gateways within a predefined perimeter. For example, the telecommunications service provider server 106 may transmit the grey list only to private gateways within a certain area depending on jurisdictional boundaries associated with the request from the government agency server 104.

In an embodiment, the private gateway 108 is configured to couple one or more user equipment (UE) including UE 102 to the network 114 via the eNodeB (eNB) 110 and/or the WIFI access point 116. The private gateway 108 may facilitate improved data communication with the RAN for example by improving data coverage and/or increasing download speeds for the UE 102. The private gateway 108 may receive and store the grey list from the telecommunications service provider server 106. In an embodiment, the private gateway 108 identifies data messages associated with the party of interest being transmitted through the private gateway 108 from one or more UE (e.g., UE 102) based on the identifying information included in the grey list and then continues transmission of such identified data messages to the intended endpoints. The identified data messages may comprise any type of data messages. For example, the identified messages may comprise text messages such as short message service (SMS) messages and multimedia messaging service (MMS) messages as well as messaging application messages, in-app messages, email messages, and/or other types of messages.

The private gateway 108 may store the identified data messages and corresponding metadata in the message data store 112. The metadata associated with each identified data message may comprise a time stamp, an originating endpoint, a destination endpoint, an application associated with an identified data message, and/or other information. In an embodiment, the private gateway 108 stores the identified data messages and corresponding metadata in one or more block chains in the message data store 112. Each identified data message and its corresponding metadata may be stored in a separate block in a block chain. In an embodiment, each block chain corresponds to a single communication session. Identified data messages may be determined to correspond to a particular communication session based on the metadata associated with the identified data messages. For example, identified data messages within a predefined period of time of each other may be determined to correspond to the same communication session. In another non-limiting example, identified data messages associated with the same application may be determined to correspond to the same communication session.

The telecommunications service provider server 106 may transmit the identified data messages and corresponding metadata from the message data store 112 to the government agency server 104 to comply with the request for messages. If the identified data messages and corresponding metadata are stored in one or more block chains, the telecommunications service provider server 106 may transmit the one or more block chains to the government agency server 104 to comply with the request for messages.

Duplication of the identified data messages may be prevented by including instructions and/or microcode stored in a genesis block of each block chain that prevent reproduction of each block chain. In an embodiment, block chain software that builds each block abides by the instructions not to reproduce any of the blocks. Each of the created block chains stored in the message data store 112 may be named with a specific block chain identity. To help ensure that no copies of the one or more block chains transmitted to the government agency server 104 remain on the telecommunications service provider's system, the message data store 112 may be scanned for each block chain identity of the one or more blocks after transmission of the one or more blocks to the government agency server 104.

In an embodiment, the government agency server 104 provides the telecommunications service provider server 106 with updated identifying information associated with the party. The telecommunications service provider server 106 may update the grey list based on the updated identifying information received from the government agency server 104 and transmit the updated grey list to one or more private gateways including the private gateway 108. The private gateway 108 (and the other private gateways that receive the updated grey list) may replace the grey list with the updated grey list and begin identifying and storing data messages associated with the party of interest being transmitted through the private gateway 108 from one or more UE (e.g., UE 102) based on the updated identifying information included in the updated grey list.

In an embodiment, in additional to archiving data messages associated with the party of interest being transmitted through the private gateway 108 as discussed above, voice messages associated with the party of interest from one or more UE (e.g., UE 102) may be identified based on the identifying information included in the initial request from the government agency server 104. The voice messages may be identified by the telecommunications service provider server 106 or another server.

The identified voice messages may be stored and associated with the identified data messages in the message data store 112 based on corresponding metadata. In an embodiment, the identified voice messages may be stored with the identified data messages in one or more block chains in the message data store 112. Each identified message and its corresponding metadata may be stored in a separate block in a block chain. In an embodiment, each block chain corresponds to a single communication session. Identified data and voice messages may be determined to correspond to a particular communication session based on the metadata associated with the identified messages. For example, identified messages within a predefined period of time of each other may be determined to correspond to the same communication session.

The telecommunications service provider server 106 may transmit the identified data and voice messages and corresponding metadata from the message data store 112 to the government agency server 104 to comply with the request for messages. If the identified data and voice messages and corresponding metadata are stored in one or more block chains, the telecommunications service provider server 106 may transmit the one or more block chains to the government agency server 104 to comply with the request for messages.

It is understood that any number of UEs 102, any number of government agency servers 104, any number of telecommunications service provider servers 106, any number of private gateways 108, any number of eNBs 110, any number of message data stores 112, and any number of WIFI access points 116 may exist in the system 100. In an embodiment, the UE 102 may have other components, which are not shown, such as a near field communication (NFC) radio transceiver or other components. The government agency server 104 and the telecommunications service provider server 106 may be server computers. Server computers are discussed in more detail hereinafter.

Figure 2:
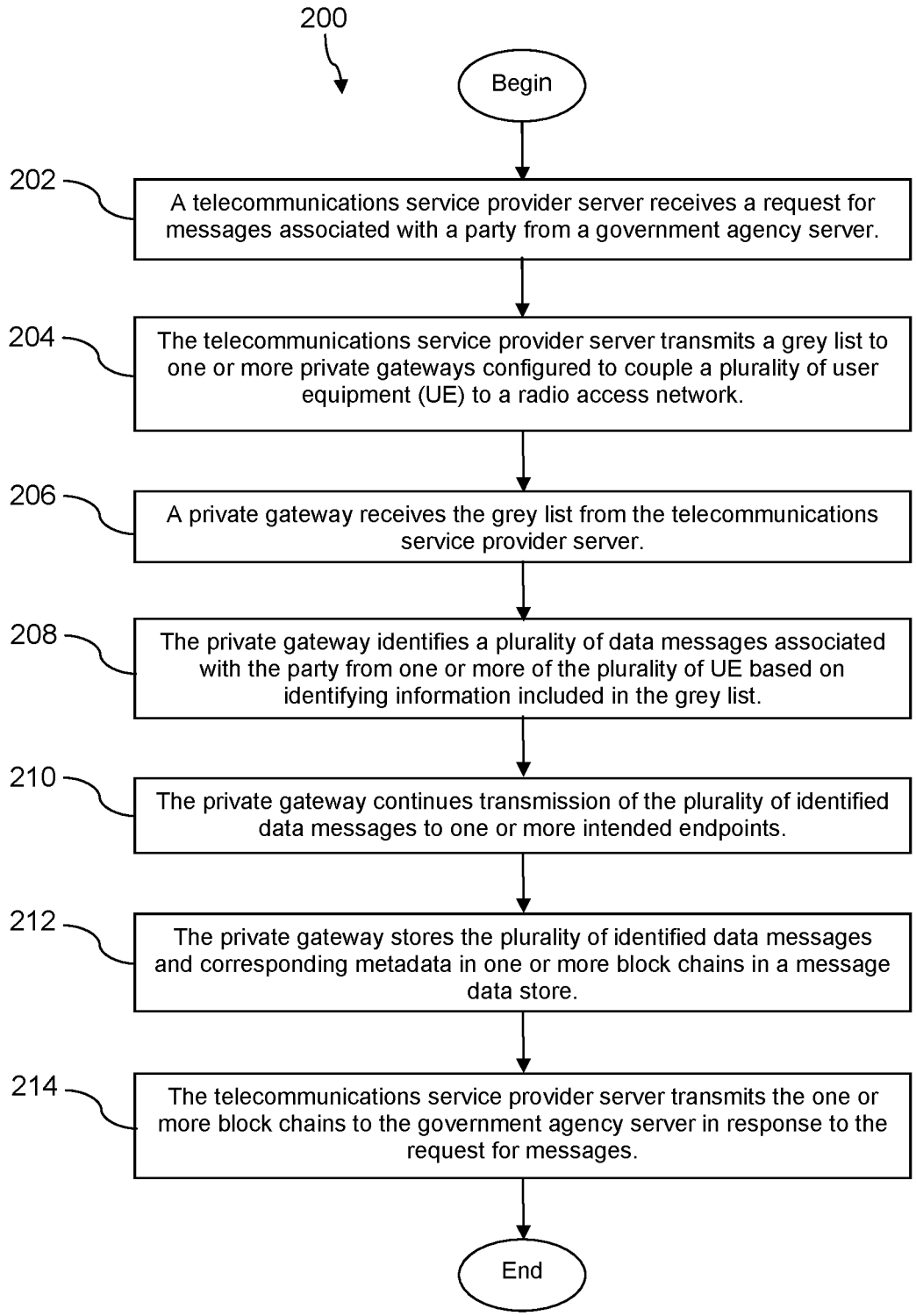
FIG. 2 is a flow chart of a method according to an embodiment of the disclosure.

Turning now to FIG. 2, a method 200 is described. At block 202, a telecommunications service provider server (e.g., the telecommunications service provider server 106) receives a request for messages associated with a party from a government agency server (e.g., the government agency server 104). The request may comprise identifying information associated with the party. At block 204, the telecommunications service provider server transmits a grey list to one or more private gateways configured to couple a plurality of user equipment (UE) to a radio access network. The grey list may comprise the identifying information associated with the party.

At block 206, a private gateway (e.g., the private gateway 108) receives the grey list from the telecommunications service provider server. At block 208, the gateway identifies a plurality of data messages associated with the party from one or more of the plurality of UE based on identifying information included in the grey list. At block 210, the private gateway continues transmission of the plurality of identified messages to one or more intended endpoints. At block 212, the private gateway stores the plurality of identified data messages and corresponding metadata in one or more block chains in a message data store (e.g., the message data store 112). At block 214, the telecommunications service provider server transmits the one or more block chains to the government agency server in response to the request for messages.

Figure 3:
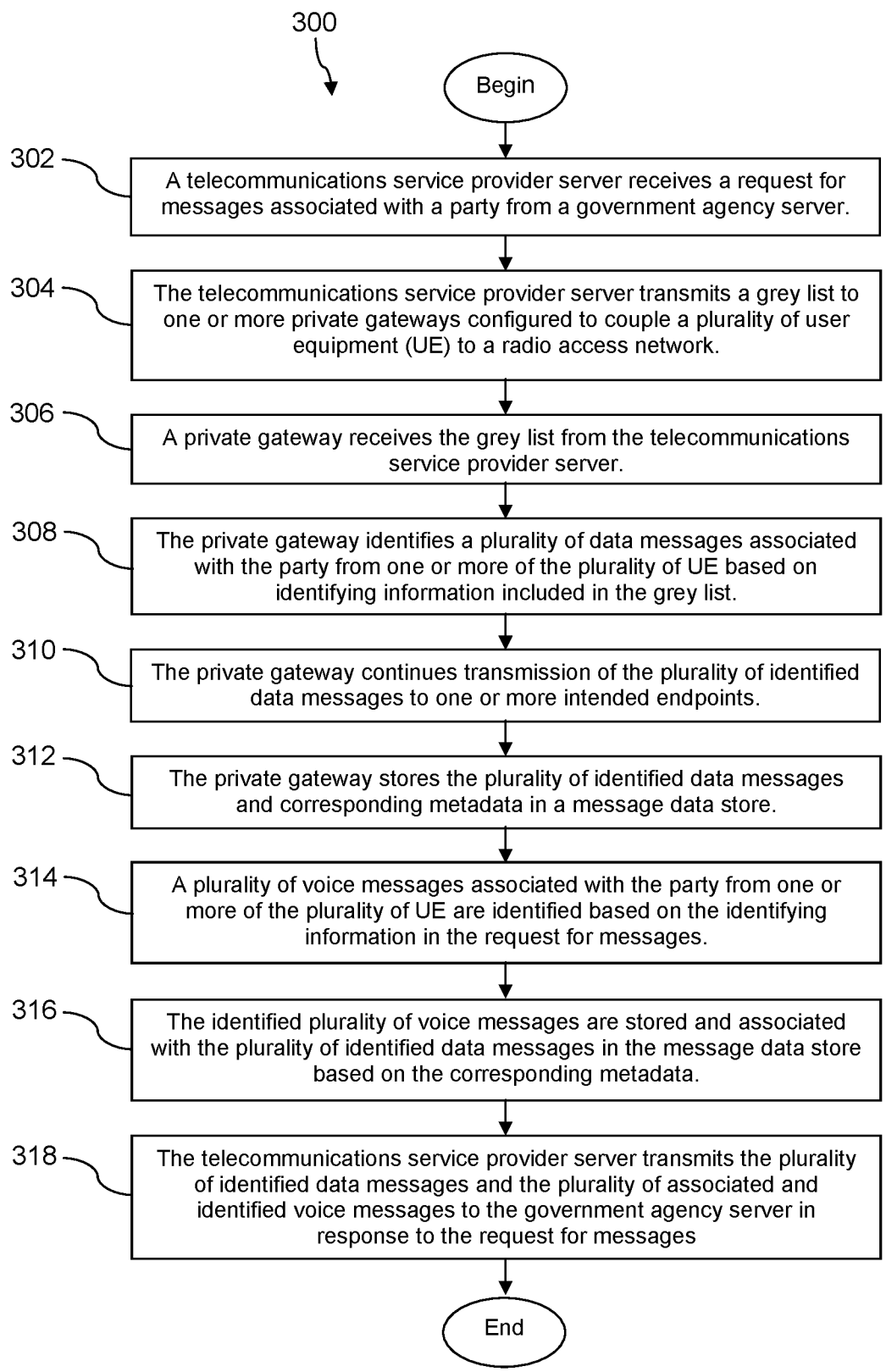
FIG. 3 is a flow chart of another method according to an embodiment of the disclosure.

Turning now to FIG. 3, a method 300 is described. At block 302, a telecommunications service provider server (e.g., the telecommunications service provider server 106) receives a request for messages associated with a party from a government agency server (e.g., the government agency server 104). The request may comprise identifying information associated with the party. At block 304, the telecommunications service provider server transmits a grey list to one or more private gateways configured to couple a plurality of user equipment (UE) to a radio access network. The grey list may comprise the identifying information associated with the party.

At block 306, a private gateway (e.g., the private gateway 108) receives the grey list from the telecommunications service provider server. At block 308, the private gateway identifies a plurality of data messages associated with the party from one or more of the plurality of UE based on identifying information included in the grey list. At block 310, the private gateway continues transmission of the plurality of identified data messages to one or more intended endpoints. At block 312, the private gateway stores the plurality of identified data messages and corresponding metadata in a message data store (e.g., the message data store 112).

At block 314, a plurality of voice messages associated with the party from one or more of the plurality of UE are identified based on the identifying information in the request for messages. At block 316, the identified plurality of voice messages are stored and associated with the plurality of identified data messages in the message data store based on the corresponding metadata. At block 318, the telecommunications service provider server transmits the plurality of identified data messages and the plurality of associated and identified voice messages to the government agency server in response to the request for messages.

Figure 4:
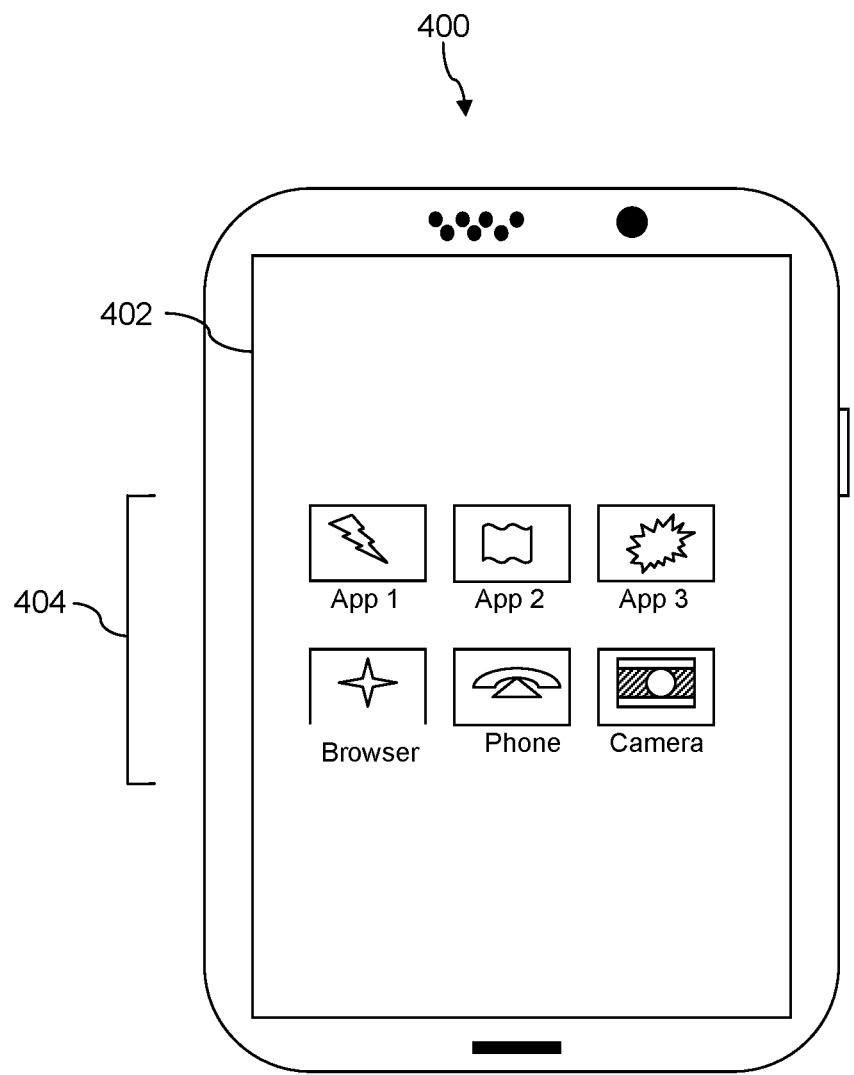
FIG. 4 is an illustration of a user equipment (UE) according to an embodiment of the disclosure.

FIG. 4 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 5:
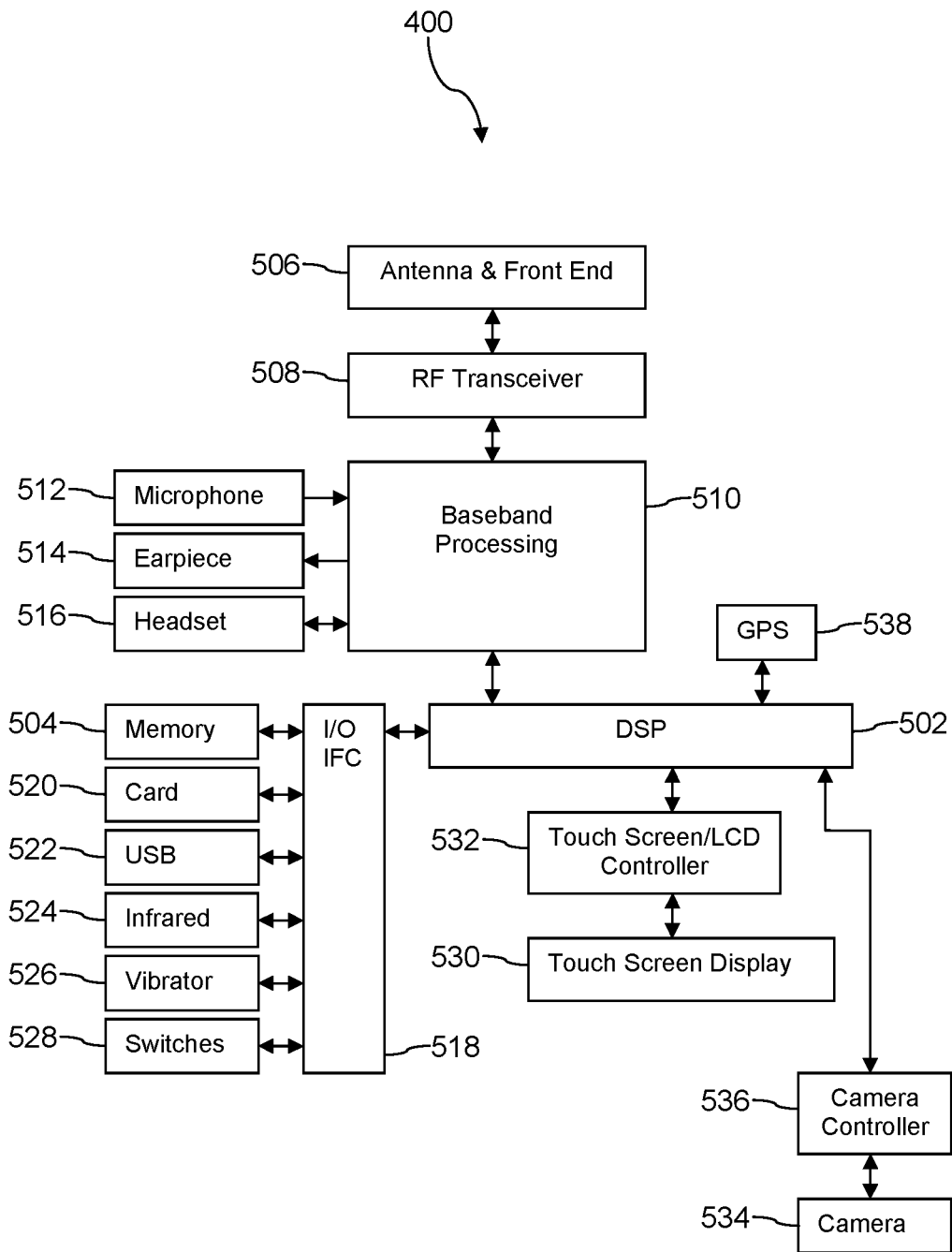
FIG. 5 is a block diagram of a hardware architecture according to an embodiment of the disclosure.

FIG. 5 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 6A:
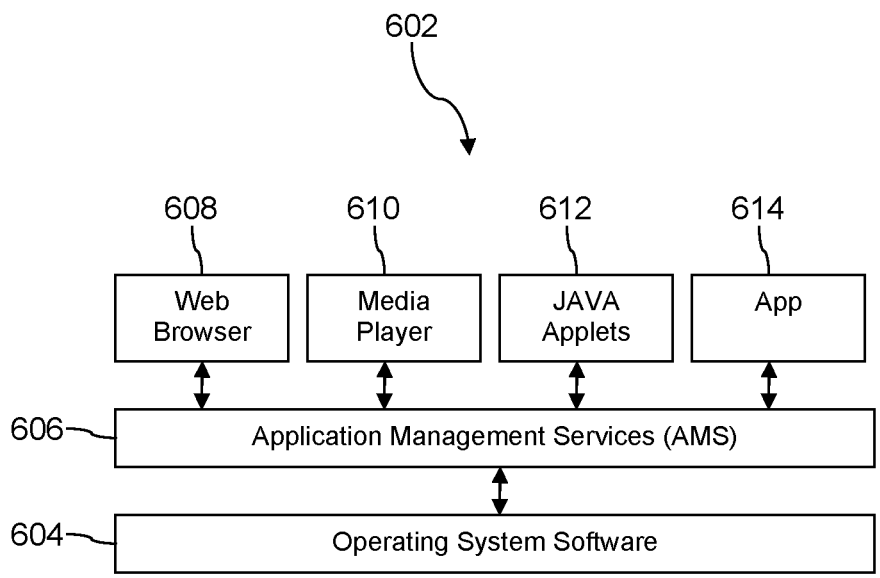
FIG. 6A is a block diagram of a software architecture according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 6A are a web browser application 608, a media player application 610, and JAVA applets 612. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 6B:
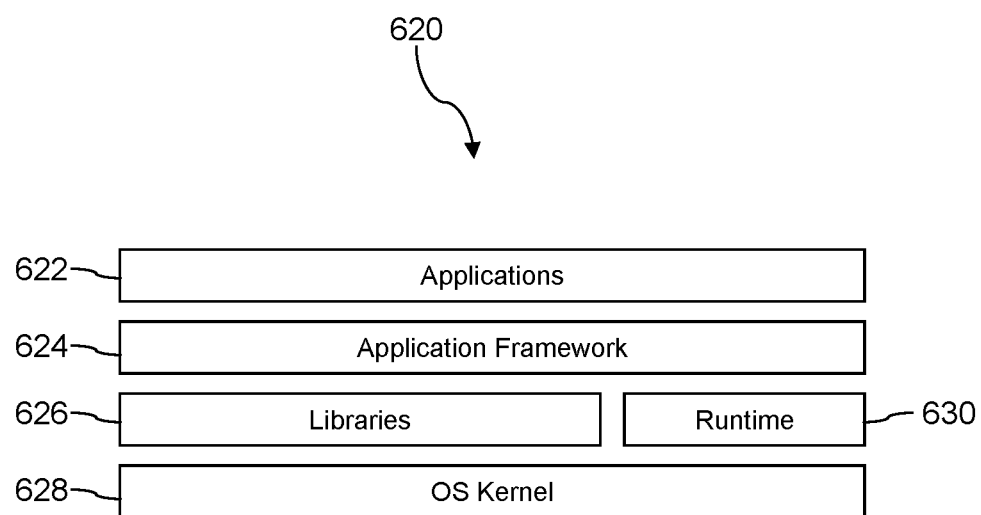
FIG. 6B is a block diagram of another software architecture according to an embodiment of the disclosure.

FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
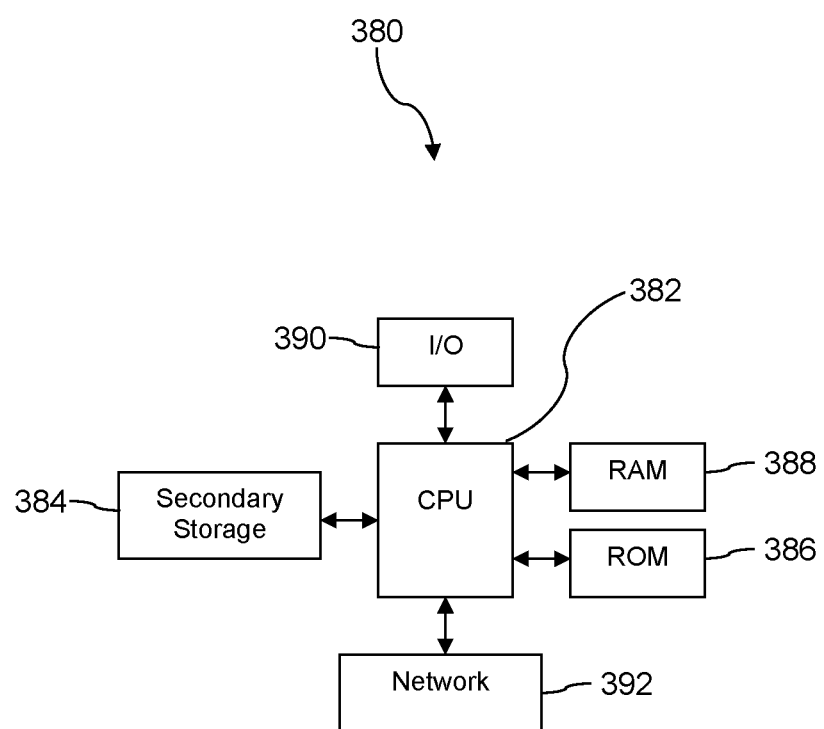
FIG. 7 is block diagram of a computer system according to an embodiment of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A message archival and retrieval system comprising:
a telecommunications service provider server comprising a non-transitory memory and a processor that:
receives a request for messages associated with a party from a government agency server, wherein the request comprises identifying information associated with the party, and
transmits a grey list to one or more private gateways, wherein the grey list comprises the identifying information associated with the party; and
a private gateway of the one or more private gateways configured to couple a plurality of user equipment (UE) to a radio access network, the private gateway comprising a non-transitory memory and a processor that:
receives the grey list from the telecommunications service provider server,
identifies a plurality of data messages associated with the party from one or more of the plurality of UE based on the identifying information included in the grey list,
continues transmission of the plurality of identified data messages to one or more intended endpoints,
determines that a subset of the plurality of identified data messages is associated with a same communication session based on metadata corresponding to the subset, and
stores the plurality of identified data messages and corresponding metadata in one or more block chains in a message data store, wherein the subset of the plurality of identified data messages associated with the same communication session and the metadata corresponding to the subset are stored in one or more blocks of a block chain of the one or more block chains such that the block chain corresponds to the same communication session, and wherein the one or more block chains are transmitted to the government agency server in response to the request for messages.

2. The system of claim 1, wherein the identifying information comprises one or more of a name, a telephone phone number, a nickname, an alias name, or an alias telephone number.

3. The system of claim 1, wherein the identified data messages comprise one or more of short message service (SMS) messages, multimedia messaging service (MMS) messages, messaging application messages, in-app messages, or email messages.

4. The system of claim 1, wherein the metadata associated with each identified data message comprises one or more of a time stamp, an originating endpoint, a destination endpoint, or an application associated with the identified data message.

5. The system of claim 4, wherein each identified data message associated with a same communication session is stored in a separate block of one of the one or more block chains.

6. The system of claim 5, wherein identified data messages are determined to be associated with the same communication session based on the metadata associated with the identified data messages.

7. The method of claim 1, wherein the processor further tracks an application sending one or more of the identified data messages when rotating Internet Protocol (IP) addresses are being used and identifies a relevant data message associated with the party based on the tracking.

8. The method of claim 1, wherein the plurality of UE comprise one or more of a mobile phone, a personal digital assistant (PDA), a media player, a wearable computer, a headset computer, a laptop computer, a tablet computer, a notebook computer, or an Internet of Things (IoT) device.

9. The system of claim 1, wherein the request for messages comprises a Communications Assistance for Law Enforcement Act (CALEA) request.

10. A method for message archival and retrieval comprising:
receiving, by a telecommunications service provider server, a request for messages associated with a party from a government agency server, wherein the request comprises identifying information associated with the party;
transmitting, by the telecommunications service provider server, a grey list to one or more private gateways configured to couple a plurality of user equipment (UE) to a radio access network, wherein the grey list comprises the identifying information associated with the party;
receiving, by a private gateway of the one or more private gateways, the grey list from the telecommunications service provider server;
identifying, by the private gateway, a plurality of data messages associated with the party from one or more of the plurality of UE based on the identifying information included in the grey list;
continuing, by the private gateway, transmission of the plurality of identified data messages to one or more intended endpoints;
determining, by the private gateway, that a subset of the plurality of identified data messages is associated with a same communication session based on metadata corresponding to the subset;
storing, by the private gateway, the plurality of identified data messages and corresponding metadata in one or more block chains in a message data store, wherein the subset of the plurality of identified data messages associated with the same communication session and the metadata corresponding to the subset are stored in one or more blocks of a block chain of the one or more block chains such that the block chain corresponds to the same communication session; and
transmitting, by the telecommunications service provider server, the one or more block chains to the government agency server in response to the request for messages.

11. The method of claim 10, wherein the identifying information comprises one or more of a name, a telephone phone number, a nickname, an alias name, or an alias telephone number.

12. The method of claim 10, wherein the identified data messages comprise one or more of short message service (SMS) messages, multimedia messaging service (MMS) messages, messaging application messages, in-app messages, or email messages.

13. The method of claim 10, wherein the metadata associated with each identified data message comprises one or more of a time stamp, an originating endpoint, a destination endpoint, or an application associated with the identified data message.

14. The method of claim 10, further comprising:
updating, by the telecommunications service provider server, the grey list based on updated identifying information associated with the party;
transmitting, by the telecommunications service provider server, the updated grey list to the one or more private gateways; and
replacing, by the one or more private gateways, the grey listed with the updated grey list.

15. The method of claim 10, wherein the one or more private gateways are a subset of a plurality of private gateways within a predefined perimeter.

16. The method of claim 10, wherein a genesis block of each block chain of the one or more block chains comprises instructions that prevent reproduction of the block chain.

17. The method of claim 16, further comprising scanning the message data store for each block chain identity of the one or more block chains after transmission of the one or more block chains to the government agency server to confirm that no copies of the one or more block chains exist on the message data store.

18. A method for message archival and retrieval comprising:
receiving, by a telecommunications service provider server, a request for messages associated with a party from a government agency server, wherein the request comprises identifying information associated with the party;
transmitting, by the telecommunications service provider server, a grey list to one or more private gateways configured to couple a plurality of user equipment (UE) to a radio access network, wherein the grey list comprises the identifying information associated with the party;
receiving, by a private gateway of the one or more private gateways, the grey list from the telecommunications service provider server;
identifying, by the private gateway, a plurality of data messages associated with the party from one or more of the plurality of UE based on the identifying information included in the grey list;
continuing, by the private gateway, transmission of the plurality of identified data messages to one or more intended endpoints;
storing, by the private gateway, the plurality of identified data messages and corresponding metadata in a message data store;
identifying a plurality of voice messages associated with the party from one or more of the plurality of UE based on the identifying information in the request for messages;
determining that one or more of the plurality of identified data messages and one or more of the plurality of identified voice messages are associated with a same communication session based on metadata corresponding to the one or more of the plurality of identified data messages and metadata corresponding to the one or more of the plurality of identified voice messages;
storing the one or more of the plurality of identified data messages associated with the same communication session, the metadata corresponding to the one or more of the plurality of identified data messages, the one or more of the plurality of identified voice messages associated with the same communication session, and the metadata corresponding to the one or more of the plurality of identified voice messages in one or more blocks of a block chain such that the block chain corresponds to the same communication session; and
transmitting, by the telecommunications service provider server, the block chain to the government agency server in response to the request for messages.

19. The method of claim 18, wherein the identified data messages comprise one or more of short message service (SMS) messages, multimedia messaging service (MMS) messages, messaging application messages, in-app messages, or email messages.

20. The method of claim 18, wherein the metadata associated with each identified data message comprises one or more of a time stamp, an originating endpoint, a destination endpoint, or an application associated with the identified data message.

* * * * *